United States Patent [19]
Piriou et al.

[11] Patent Number: 5,544,736
[45] Date of Patent: Aug. 13, 1996

[54] ULTRACLEAN TRANSPORTATION

[75] Inventors: Jean-Pierre Piriou, Cholet; Jean-Jacques Hermant, Angers; Hervé Roussel, Bouchemaine, all of France

[73] Assignees: UNIR (Ultra Propre Nutrition Industrie Recherche) Association Loi de 1901, Paris; Protial S.A., Beaucouze, both of France

[21] Appl. No.: 424,395

[22] Filed: May 24, 1995

[30] Foreign Application Priority Data

Oct. 22, 1992 [FR] France ................... 92 12659

[51] Int. Cl.⁶ ....................... B65G 47/22
[52] U.S. Cl. ............................ 198/493
[58] Field of Search ................ 198/493, 494, 198/580; 414/217

[56] References Cited

U.S. PATENT DOCUMENTS

| | | | |
|---|---|---|---|
| 3,587,524 | 6/1971 | Keating | 198/494 X |
| 3,749,229 | 7/1973 | Napadow | 198/493 X |
| 4,137,344 | 1/1979 | Lasne et al. | 198/494 X |
| 4,258,779 | 3/1981 | Musschoot | 198/580 X |
| 4,488,634 | 12/1984 | West | 198/493 |
| 4,960,200 | 10/1990 | Pierce . | |

FOREIGN PATENT DOCUMENTS

| | | |
|---|---|---|
| 2521535 | 8/1983 | France . |
| 64720 | 9/1892 | Germany . |
| 1297917 | 11/1972 | United Kingdom . |

*Primary Examiner*—D. Glenn Dayoan
*Attorney, Agent, or Firm*—Young & Thompson

[57] ABSTRACT

Process and installation for the ultraclean continuous transportation of material from a point P to a point P' within a bacteriologically controlled zone by a conveyor. The conveyor is continuously covered from upstream of point P with respect to the direction of travel of the conveyor, to downstream of point P', with a solid covering whose surface adapted to come into contact with the material is sterile. The material is deposited at point P on the covering, and the transported material is removed from contact with the solid covering at point P'. The path of the material is enclosed at least between points P and P', and a bacteria-free atmosphere is established in this enclosed path.

8 Claims, 2 Drawing Sheets

ULTRACLEAN TRANSPORTATION

FIELD OF THE INVENTION

The present invention relates to a process for the continuous ultraclean transportation of products from a point P to a point P' within a bacteriologically-controlled zone by means of a conveyor, as well as the installation for practicing the process.

BACKGROUND OF THE INVENTION

Certain fields of industry such as particularly the field of agro-food industry, require nowadays the installation of workstations disposed in microfiltered atmospheres so as to avoid any microbiological contamination of the products. These new requirements translate to workstations disposed remotely and interconnected by means of a tunnel or a chamber with bacteriologically-controlled atmosphere, so as to permit the movement of the products or containers from a point P to a point P' in the absence of any contamination of microbial origin. However, these devices also have a certain number of drawbacks, particularly because the products are transported on a conveyor such as a conveyor band or a conventional belt which generally has not undergone any decontamination other than periodic cleaning and disinfection. In spite of everything, in certain cases the belts will be, in the course of their return run toward the point of deposition of the products, washed and then dried so as to have clean belts but which are not sterilized or nearly sterilized. A second process to overcome this drawback of contamination of the products by the conveyor consists in enclosing the products with an external covering which is constituted for example by a gas-proof barrier so as to protect the product from all contamination. Obviously, this type of process is cumbersome and limits the handling of the product.

OBJECT OF THE INVENTION

The object of the present invention is therefore to provide a process for ultraclean transportation as well as the installation practicing this process, the installation and the process permitting transporting products or containers from a point P to a point P' with the aid of a sterile or semisterile conveyor.

SUMMARY OF THE INVENTION

The invention relates to this end to a process for continuous ultraclean transportation of products and/or containers from a point P to a point P' within a bacteriologically-controlled zone by means of a conveyor, characterized in that the receiving surface of the conveyor is continuously covered from upstream of point P with a solid covering whose surface adapted to come into contact with the products and/or the containers is sterile or substantially sterile, the products and/or containers to be transported on said covering are deposited at the point P within the bacteriologically-controlled zone and the transported products and/or containers are recovered at point P' within said zone.

According to one embodiment, the covering is eliminated or recovered or recycled downstream of the point P' of the receiving surface of the conveyor, by mechanical, chemical, thermal or other means.

This covering forming a film can be either a multilayer covering of which at least one of the interfaces between any two contiguous layers is sterile or semi-sterile, or a covering constituted by a sterilizable film-forming solution.

The invention moreover relates to an ultraclean installation characterized in that it comprises a conveyor for transporting products or containers from a point P to a point P', a zone with bacteriologically-controlled atmosphere disposed at least over the portfon P P', means for depositing a sterile or semi-sterile solid covering upstream of point P, optionally means for recovering said covering disposed downstream of the point P', and means for depositing and recovering products and/or containers to be transported on said covering.

BRIEF DESCRIPTION OF THE DRAWINGS

Other characteristics and advantages of the invention will become apparent from the reading of the description which follows and the accompanying drawings, which description and drawings are given only by way of example. In these drawings.

DETAILED DESCRIPTION OF THE INVENTION

Figure 1:
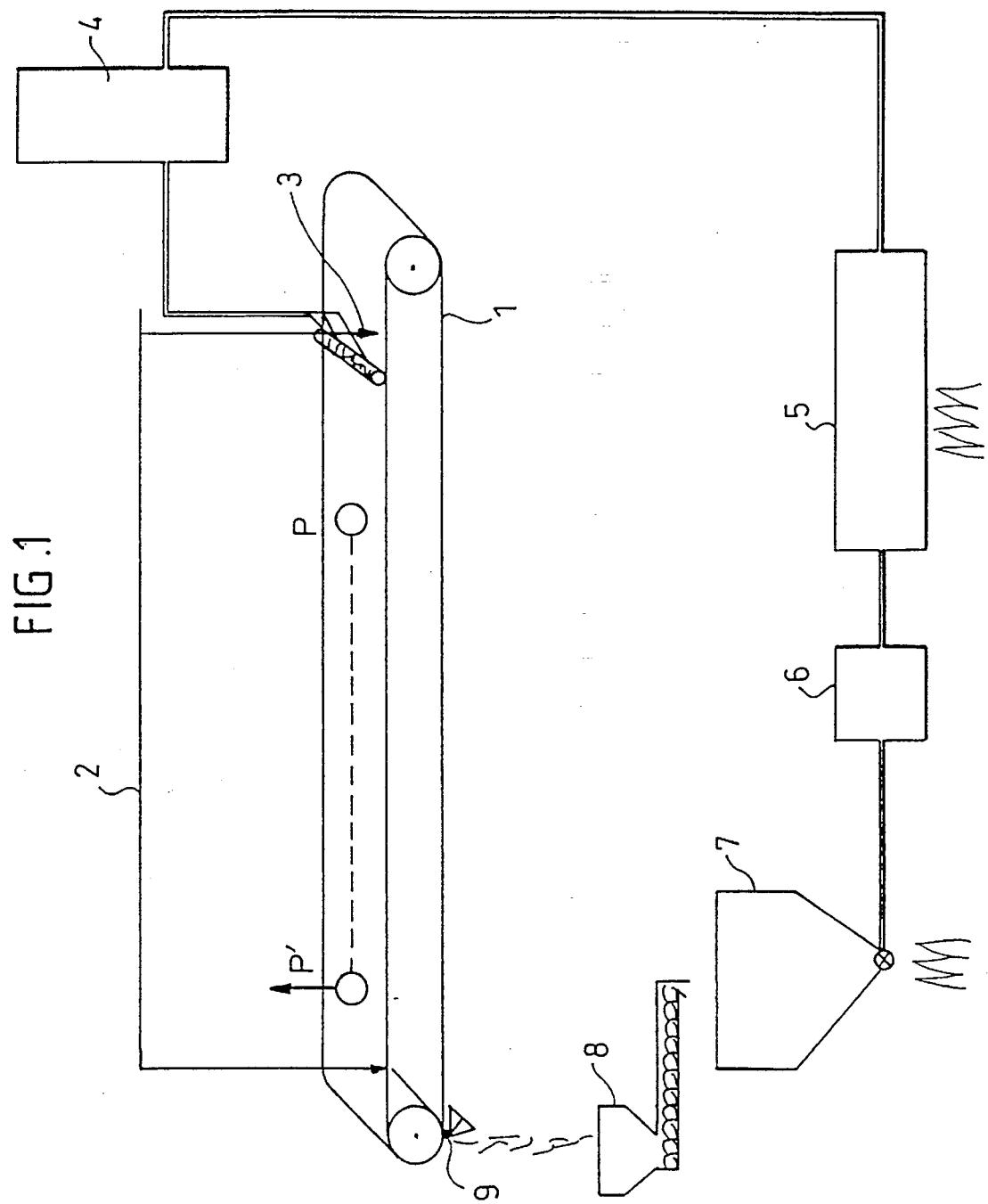
FIG. 1 is a simplified schematic view of an installation according to the invention using a covering constituted by a material or a sterilizable film-forming solution.

According to FIG. 1, the practice of the process requires having a conveyor such as a conveyor belt 1, preferably cooled, which passes through a bacteriologically-controlled zone 2. This zone can, by way of example, be constituted by an enclosure or a tunnel with laminar flow. Within this zone, there is defined a portion P P', the point P corresponding to the depositing of the product (or the container) on the receiving surface of the conveyor, the point P' corresponding to the recovery of said product from the receiving surface of the conveyor belt. These products can be of any type, including foodstuffs and can be exposed or disposed in containers. By "products" is also meant the containers themselves, empty or full.

Upstream from point P, or at point P, there is defined a point designated 3 in FIG. 1 which refers to the point of beginning to emplace the covering. This covering can, according to FIG. 1, be constituted by a film-forming solution, prepared under sterile or nearly sterile conditions which solidifies rapidly and can, substantially in an instantaneous manner from the time at which it is deposited on the receiving surface of the conveyor, harden so as to form a film. By way of example of film-forming materials or solutions, there can be cited ice, microcrystalline waxes, methylcellulose and its derivatives, foodstuff proteins, etc. To obtain the shaping of this solution in the form of a film, it is possible to deposit the liquid solution on the conveyor belt just at the beginning of zone 2 of bacteriologically-controlled atmosphere and to cause said solution to pass beneath a roller so as to obtain a homogeneous thickness of the solution. The deposition can be effected by means of a pump and a flat narrow nozzle.

Figure 2:
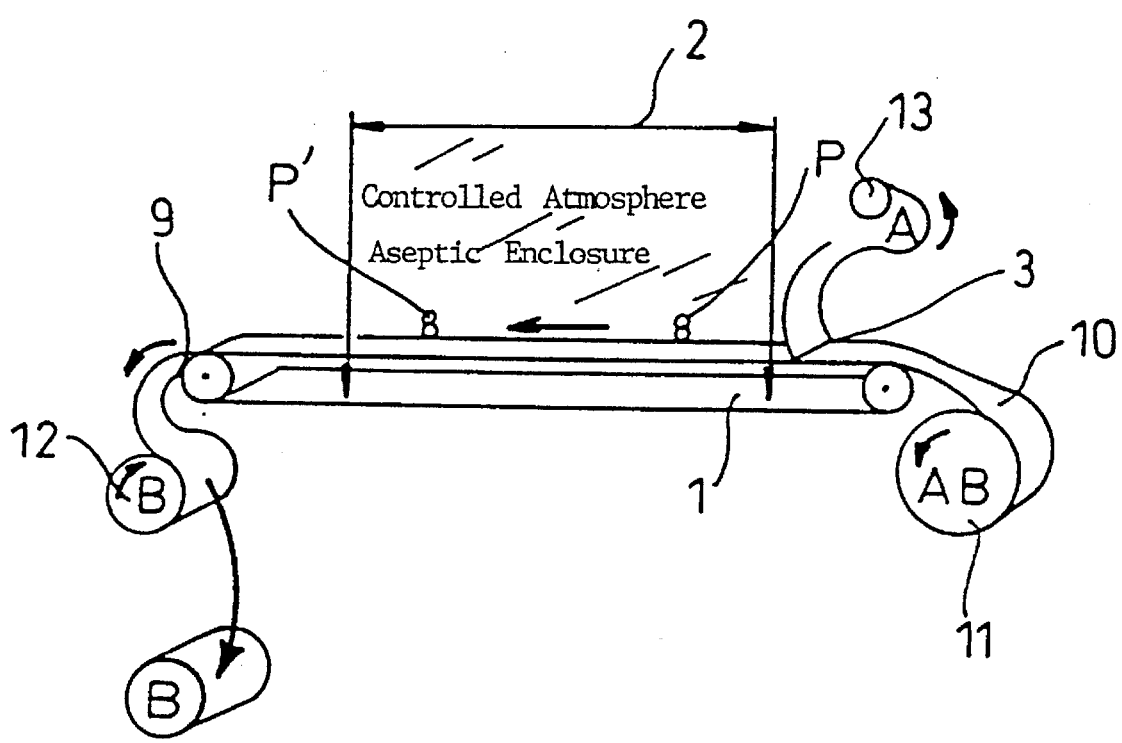
FIG. 2 is a simplified schematic view of another installation according to the invention, in which the covering is a multilayer film produced under sterile or nearly sterile conditions.

When the covering has moved beyond point P', it is generally recovered at a station designated 9 in FIGS. 1 and 2. According to the type of covering used, the removal and recovery means of said covering will be different. In the case of a material or a sterilizable film-forming solution, the film is preferably recovered according to FIG. 1 by peeling, scraping or simple separation of the receiving surface from the products of the conveyor, then cut up or crushed in an apparatus designated 8 in FIG. 1 before being reliquified or melted in a tank designated 7 in FIG. 1, then filtered according to step 6 of FIG. 1 before being sterilized, according to step 5 of FIG. 1, for again forming a sterilizable film-forming solution which, in a final step, will be redeposited on the receiving surface of the conveyor. In this case, it is possible to operate in closed circuit and to deposit the covering continuously without it being necessary to use a large quantity of material.

In another embodiment according to FIG. 2, the covering is present initially in the form of a solid covering such as a multilayer film, of which at least one of the interfaces between any two contiguous layers is sterile or substantially sterile. Thus, in the case of a two-layer film such as shown in FIG. 2, when said film is deposited at point 3 from a spool 11, the layer disposed above the sterile or substantially sterile interface is peeled off and recovered on the spool 13, while the other layer remains in position on the surface that receives the products to be conveyed and will be eliminated at 9 by recovering said film on a spool 12 which can in its turn be conveyed to a treatment structure for recovering all of the material.

One could, in another embodiment of the invention, eliminate the step of recovering a portion of the film on the spool 12 at the point designated 9. This elimination can only be performed from the moment at which a multilayer film is available having several sterile or substantially sterile interfaces, such that upstream of point P, at the point designated 3 in FIG. 2, the element of the covering disposed between the sterile interface and the interface which, at time t, has been sterilized and has already been used during a preceding passage on the portion P P', is eliminated.

It is also possible to envisage a total elimination after several circuits of the conveyor belt.

The zone 2, which is aseptic or bacteriologically controlled, can be constituted by an enclosure of a tunnel whose atmosphere is controlled or microfiltered. This type of enclosure or tunnel is well known to those skill in the art. As to the conveyor 1, it can be constituted by a conveyor belt such as shown in FIGS. 1 and 2, cooled or not, or by any other continuous transport means. Thanks to this process and the installation for practicing this process, there is avoided any contamination in the course of the transportation of merchandise or products or their containers from a point P to a point P'.

We claim:

1. Process for the ultraclean continuous transportation of material from a point P to a point P' within a bacteriologically controlled zone by means of a conveyor, comprising continuously covering the conveyor from upstream of point P to downstream of point P' with respect to the direction of travel of the conveyor, with a solid covering whose surface adapted to come into contact with the material is sterile, depositing said material at point P on said covering, removing the transported material from contact with the solid covering at point P', enclosing the path of said material at least between points P and P', and establishing a bacteria-free atmosphere in said enclosed path.

2. A process as claimed in claim 1, wherein the surface of the conveyor that supports said material is covered by a multilayer covering of which at least one of the interfaces between any two contiguous layers is sterile.

3. A process according to claim 1, and removing said solid covering from the conveyor downstream of point P', sterilizing the removed covering, and recycling the sterilized covering to the conveyor upstream of point P.

4. A process according to claim 3, wherein the covering is ice which is frozen upstream of point P, and melted and sterilized before being recycled to point P.

5. Installation for the ultraclean continuous transportation of material from a point P to a point P' by means of a conveyor, comprising means to apply a solid covering to an upper surface of the conveyor upstream of point P and to remove the solid covering downstream of point P', and a sterile enclosure surrounding the conveyor at least between points P and P'.

6. Installation as claimed in claim 5, wherein the applying means comprise a pump and a flat narrow nozzle.

7. Installation according to claim 5, wherein the solid covering is one layer of a multilayer film having a sterile interface with a covering that is peeled off the sterile interface upstream of point P.

8. An installation according to claim 5, and means to sterilize the covering removed downstream of point P' and to recycle the covering upstream of point P.

* * * * *